US009437111B2

(12) United States Patent
Ignaczak et al.

(10) Patent No.: US 9,437,111 B2
(45) Date of Patent: Sep. 6, 2016

(54) BOUNDARY DETECTION SYSTEM

(71) Applicant: Ford Global Technologies, LLC, Dearborn, MI (US)

(72) Inventors: Brad Ignaczak, Canton, MI (US); Cynthia M. Neubecker, Westland, MI (US); Brian Bennie, Sterling Heights, MI (US); Thomas Lee Miller, Ann Arbor, MI (US); Randy Michael Freiburger, Novi, MI (US); Eric L Reed, Livonia, MI (US); Scott Alan Watkins, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 47 days.

(21) Appl. No.: 14/292,685

(22) Filed: May 30, 2014

(65) Prior Publication Data

US 2015/0348417 A1 Dec. 3, 2015

(51) Int. Cl.
*B60Q 1/00* (2006.01)
*G08G 1/16* (2006.01)

(52) U.S. Cl.
CPC .............. *G08G 1/165* (2013.01); *G08G 1/166* (2013.01)

(58) Field of Classification Search
CPC ........................................................ G08G 1/16
USPC ...... 340/435, 436, 438, 425.5; 701/301, 302
See application file for complete search history.

(56) References Cited

U.S. PATENT DOCUMENTS

| | | | | |
|---|---|---|---|---|
| 5,646,591 | A | 7/1997 | Issa et al. | |
| 7,289,019 | B1 * | 10/2007 | Kertes | 340/435 |
| 7,501,937 | B2 | 3/2009 | Flick | |
| 8,049,659 | B1 | 11/2011 | Sullivan et al. | |
| 8,310,353 | B2 * | 11/2012 | Hinninger | B60Q 9/008 340/435 |
| 8,504,283 | B2 * | 8/2013 | Aso et al. | 701/301 |
| 8,589,061 | B2 * | 11/2013 | Bengtsson et al. | 701/301 |
| 8,600,587 | B1 | 12/2013 | Seah et al. | |
| 9,091,558 | B2 * | 7/2015 | Su et al. | |
| 2006/0031015 | A1 * | 2/2006 | Paradie | 701/301 |
| 2008/0211690 | A1 | 9/2008 | Kinasewitz et al. | |
| 2013/0181860 | A1 | 7/2013 | Le et al. | |
| 2015/0112731 | A1 * | 4/2015 | Binion et al. | 705/4 |

FOREIGN PATENT DOCUMENTS

JP 2006321357 A 11/2006

* cited by examiner

*Primary Examiner* — Toan N Pham
(74) *Attorney, Agent, or Firm* — James P. Muraff; Neal, Gerber & Eisenberg LLP

(57) ABSTRACT

Systems and methods provide for tracking objects around a vehicle, analyzing the potential threat of the tracked objects, and implementing a threat response based on the analysis in order to keep occupants of the vehicle safe. Embodiments include a boundary detection system comprising a memory configured to store threat identification information, and a sensor unit configured to sense the object outside the vehicle and obtain sensor information based on the sensed object. The boundary detection system further includes a processor in communication with the memory and sensor unit, the controller configured to receive the sensor information, and control a threat response based on the sensor information and the threat identification information.

20 Claims, 7 Drawing Sheets

700

| Sensitivity Level | Distance from Occupied Zone | Rate of Approach | Object type Classification | Threat Level Classification |
|---|---|---|---|---|
| High | 0-5 m | Towards occupied zone, Slow | Person | High Threat Level |
| Low | 0-5 m | Towards occupied zone, Slow | Person | Low Threat Level |
| High | 5-10 m | Towards occupied zone, Medium/Fast | Motorized Vehicle | High Threat Level |
| Low | 5-10 m | Towards occupied zone, Medium/Fast | Motorized Vehicle | Low Threat Level |

FIGURE 7

BOUNDARY DETECTION SYSTEM

TECHNICAL FIELD

This disclosure generally relates to a boundary detection system for tracking the movement of objects outside of a vehicle. More particularly, the boundary detection system is configured to track objects outside of a vehicle in order to warn occupants of the vehicle of potentially threatening situations.

BACKGROUND

An occupant of a vehicle may find himself/herself in a situation where it is difficult to accurately track external events that may be occurring outside of the vehicle. In such situations, the occupant may benefit from additional assistance that monitors events and objects outside of the vehicle, and provides a notification to the occupant inside the vehicle.

SUMMARY

This application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detailed description, and such implementations are intended to be within the scope of this application.

Exemplary embodiments provide systems and methods for tracking objects that are outside of a vehicle, analyzing the tracked object in order to determine a potential threat of the tracked object to occupants of the vehicle, and implementing a threat response based on the analysis for protecting the occupants of the vehicle from the tracked object.

According to some embodiments, a vehicle boundary detection system includes at least a memory configured to store threat identification information; a sensor unit configured to sense an object outside a vehicle and obtain sensor information based on the sensed object; and a processor in communication with the memory and the sensor unit, the processor being configured to receive the sensor information, and to control a threat response based on at least one of the sensor information or the threat identification information.

According to some embodiments, a method for detecting objects within a boundary surrounding a vehicle includes at least storing, within a memory, threat identification information including information for identifying threatening situations; sensing, by a sensor unit, an object located outside a vehicle, and obtaining sensor information based on the sensed object; receiving, by a processor, the sensor information; and controlling, by the processor, a threat response based on at least one of the sensor information or the threat identification information.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

FIG. 7 illustrates an exemplary table according to some embodiments.

DETAILED DESCRIPTION OF EXAMPLE EMBODIMENTS

Figure 1:
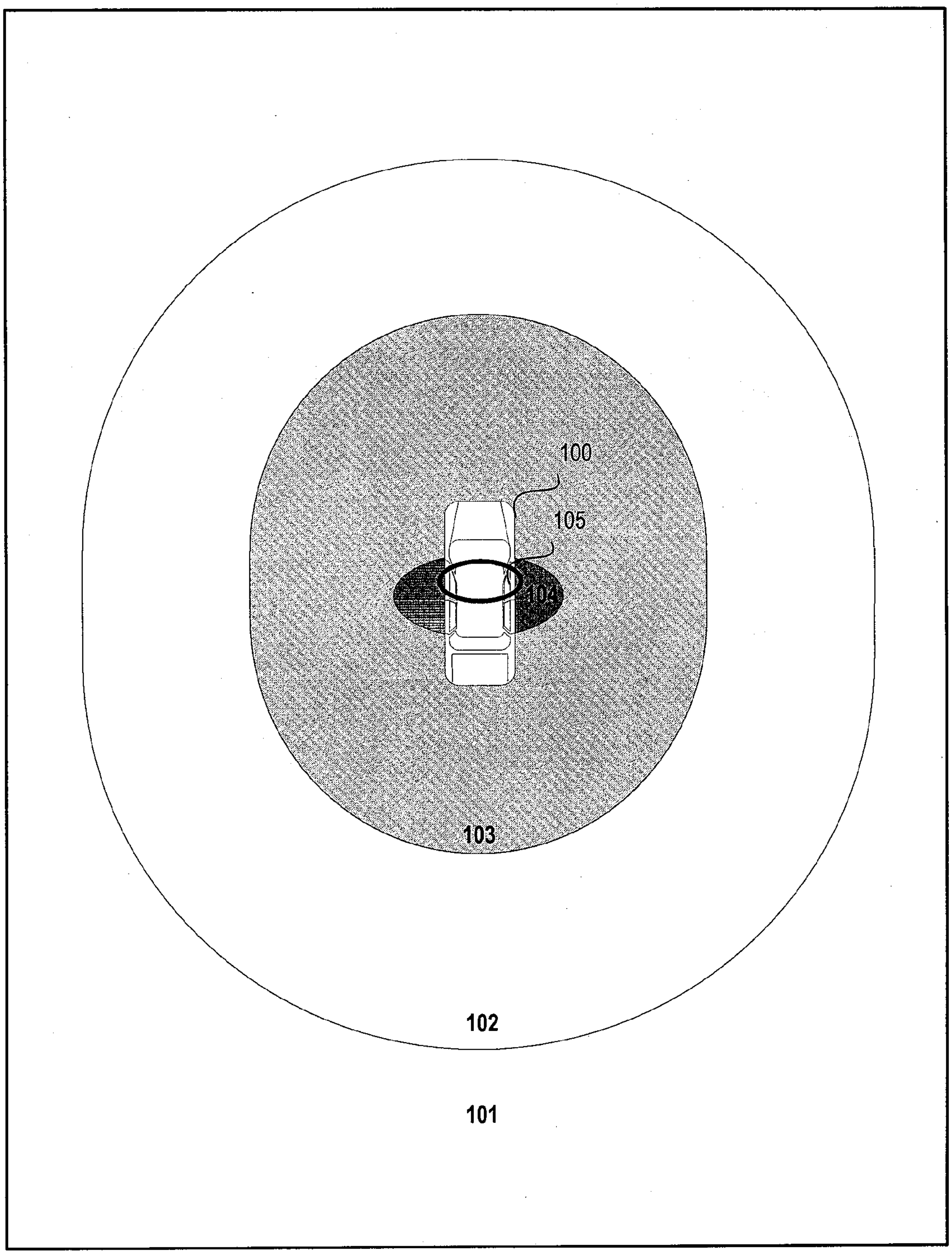
FIG. 1 illustrates a number of boundary detection zones surrounding a vehicle.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

Components and systems may be included on, and/or within, a vehicle for identifying objects that are detected around the vehicle. By identifying objects that are detected around the vehicle, further analysis may be implemented to determine whether the objects pose a threat to the safety of one or more occupants of the vehicle. For example, this disclosure describes a boundary detection system that is included as a feature of a vehicle. One or more components of the boundary detection system may be shared with one or more components of the existing vehicle components. The boundary detection system is generally comprised of one or more sensors for detecting objects located within an external vicinity of the vehicle, a memory component for storing information received from the sensors and information that may be referenced when determining a predicted threat level of the detected object in terms of the vehicle occupants, and a processor for determining whether the object may pose a threatening situation for occupants of the vehicle based on the received sensor information and the information stored on the memory. The processor may further be configured to control other features and/or components of the vehicle for implementing a threat response based on the determination of whether the object poses a threat. Although the boundary detection system has been described as being comprised of one or more sensors, a memory component and a controller, it is within the scope of this disclosure for the boundary detections system to include a greater, or fewer, number of components.

The boundary detection system may be utilized, for example, in a consumer passenger vehicle such as a sedan or truck. The boundary detection system may also be utilized, for example, on a non-civilian vehicle such as a vehicle used by a law enforcement agency, government agency, an emergency response agency (e.g., fire response agency), or a medical response agency (e.g., hospital or ambulance). This list is not exhaustive, and is provided for exemplary purposes only. It follows that the vehicle described throughout this disclosure may correspond to a consumer passenger vehicle or a specialty vehicle (e.g., police car, fire engine truck, ambulance van) used by one or more of the exemplary agencies described above.

The features, processes, and methods described herein with respect to the capabilities of the boundary detection system may be implemented by a boundary detection tool running on the boundary detection system. The boundary detection tool may be a program, application, and/or some combination of software and hardware that is incorporated on one or more of the components that comprise the boundary detection system. The boundary detection tool and the boundary detection system is described in more detail below.

Further, although the vehicle and the features corresponding to the boundary detection tool and boundary detection system described herein are applicable while the vehicle is in a parked (i.e., stationary state), it is also within the scope of this disclosure that the same features may apply while the vehicle is in a moving state.

The following description is provided based on the boundary detection tool identifying at least three distinct threat level classifications that may be assigned to an object detected outside of the vehicle 100. The three exemplary threat level classifications are no threat level classification, low threat level classification, and high threat level classification. In some embodiments, an emergency threat level classification may exist that is above the high threat level classification. The threat level classifications references are provided for exemplary purposes, as it is within the scope of the boundary detection tool to reference a greater, or fewer, number of threat level classifications. For example, in some embodiments the boundary detection tool may identify two distinct threat level classifications: a low threat class, and a high threat class. In other embodiments, the boundary detection tool may identify a no threat class as the lowest threat level classification, a high threat class as the highest threat level classification, and one or more threat level classifications in-between the no threat class and the high threat class to represent varying levels of threat in-between the no threat class and the high threat class.

FIG. 1 illustrates a vehicle 100 stationed within an environment that includes a plurality of threat level zones surrounding the vehicle 100. The far zone 101 begins at a distance that is far enough away from an occupied zone 105 (e.g., the occupied zone 105 may represent an area within the vehicle 100 where occupants may be located) of the vehicle 100 such that the boundary detection tool identifies objects within the far zone 101 as being outside a relevant range. For example, the far zone 101 may begin at a distance from the occupied zone 105 where the boundary detection tool considers objects to pose little or no threat to occupants within the occupied zone 105. In addition or alternatively, the far zone 101 may being at a distance that corresponds to the maximum sensor range for one or more sensors that comprise the boundary detection system. It follows that an object positioned within the far zone 101 may be considered by the boundary detection tool to be assigned a no threat level classification based on its distance from the occupied zone 105.

The next zone in from the far zone 101 and closer to the vehicle 100 is the mid zone 102. An object within the mid zone 102 may be tracked by one or more sensors that comprise the boundary detection system. For example, the distances from the occupied zone 105 that comprise the mid zone 102 may correspond to distances at which the boundary detection tool determines is relevant to begin tracking objects that may pose a threat to occupants within the vehicle 100. In addition or alternatively, the outside boundary of the mid zone 102 may correspond to a distance that corresponds to a maximum range of one or more sensors that comprise the boundary detection system.

Further, an object identified by the boundary detection tool as being a predetermined distance away from the occupied zone 105 to be located within the mid zone 102 may initially be classified within the no threat level classification or the low threat level classification based on its distance from the occupied zone 105. In addition, other factors considered by the boundary detection tool may increase an object's assigned threat level classification to a higher threat class (e.g., from the low threat level class to the high threat class, or from the no threat level class to the low threat level class) or decrease an object's assigned threat level class (e.g., from the low threat level class to the no threat level class). However, based on location alone, an object detected within the mid zone 102 may initially be classified by the boundary detection tool as having either no threat or low threat level classification. The other factors considered by the boundary detection tool may correspond to sensor information on the object as sensed by one or more sensors included in the boundary detection system (e.g., size of the object, velocity of the object, acceleration of the object, predicted movement/path/trajectory/position/location of the object, or predicted object type of the object). A more in-depth description on the additional factors that may change an object's threat level is provided in more detail below.

The next zone in from the mid zone 102 and closer to the vehicle 100 is the near zone 103. An object within the near zone 103 may be tracked by one or more sensors that comprise the boundary detection system. For example, the distances from the occupied zone 105 that comprise the near zone 103 may correspond to distances at which the boundary detection tool determines is relevant to track objects that may pose a threat to occupants within the vehicle 100.

Further, an object identified by the boundary detection tool as being a predetermined distance away from the occupied zone 105 to be located within the near zone 103 may initially be classified by the boundary detection tool within the low threat level classification. Other factors considered by the boundary detection tool may increase the object's threat level classification to a higher threat class (e.g., from the low threat level to the high threat level class) or decrease the object's threat level to a lower threat class (e.g., from the low threat level class to the no threat level class). However, based on location alone, an object detected within the near zone 103 may initially be classified by the boundary detection tool as having a low threat level classification. A more in-depth description on the additional factors that may change an object's threat level is provided in more detail below.

The next zone in from the near zone 103 and closer to the vehicle 100 is the critical zone 104. An object within the critical zone 104 may be tracked by one or more sensors that comprise the boundary detection system. For example, the distances from the occupied zone 105 that comprise the critical zone 104 may correspond to distances at which the boundary detection tool determines is relevant to track objects that may pose a threat to occupants within the vehicle 100.

As illustrated in FIG. 1, some embodiments may identify the critical zone 104 to only include the areas immediately adjacent to the driver side and passenger side of the vehicle because this may represent an area where occupants of the vehicle 100 may be most vulnerable. For example, objects moving along the driver side and passenger sides of the vehicle may be more difficult for occupants to detect (e.g., may include "blind spots"), as compared to objects incoming from the front or back sides of the vehicle 100. In addition or alternatively, the occupied zone 104 may include the area to the front and back of the vehicle 100 such that the critical zone 104 includes the area immediately surrounding the vehicle 100. As the critical zone 104 is the area closest to the occupied zone 105 within the vehicle 100, an object identified by the boundary detection tool as having a distance away from the occupied zone 105 to be located within the critical zone 104 may initially be classified by the boundary detection tool within the high threat level classification. Other factors considered by the boundary detection tool may increase the object's threat level to a higher threat class (e.g., from the high threat level class to a higher emergency threat level class) or decrease the object's threat level to a lower threat class (e.g., from the high threat level class to the low threat level class). However, based on location alone, an object detected within the critical zone 104 may initially be classified by the boundary detection tool as having a high threat level classification. A more in-depth description on the additional factors that may change an object's threat level is provided in more detail below.

The next zone in from the critical zone 104 is the occupied zone 105. The occupied zone is an area within the vehicle 100 where the boundary detection tool may understand occupants of the vehicle 100 to be located. In addition or alternatively, the occupied zone 105 may correspond to an area within the vehicle 100 where the boundary detection tool has identified one or more occupants of the vehicle 100 to be located based on sensor information received from one or more sensors that comprise the boundary detection system. The occupied zone is identified as an area corresponding to occupants within the vehicle 100, and referenced as a focal point by the boundary detection tool, because the boundary detection tool serves to inform occupants of external influences that may be relevant to the occupants. For example, the boundary detection tool may serve to warn occupants of the vehicle 100 concerning objects outside the vehicle 100 that the boundary detection tool has tracked and determined may pose a threat to the occupants.

It follows that based on location alone, an object being tracked from outside the vehicle 100 and then detected within the occupied zone 105 may automatically be classified by the boundary detection tool within the highest threat level classification. A more in-depth description on the additional factors that may change an object's threat level is provided in more detail below.

Although FIG. 1 is illustrated to identify five distinct zones (far zone, mid zone, near zone, critical zone and occupied zone), the exact number of zones is provided for exemplary purposes only. For example, the critical zone 104 may be incorporated into the occupied zone 105 such that the occupied zone may include an area by the passenger or driver side doors, an area immediately encircling the vehicle 100 out to a predetermined distance, or an area within the vehicle 100 where the boundary detection system has determined, or predicted, the occupants are located. Therefore, it is within the scope of this disclosure that the boundary detection tool may identify and reference fewer, or more, zones while still implementing the features described herein. Further, each zone identified by the boundary detection tool may have associated with it one or more threat level classifications as described herein.

In addition or alternatively, although reference has been made in terms of objects within specified "zones", it is within the scope of this disclosure for the boundary detection tool to instead identify one or more specified distances from the occupied zone 105 in place of the "zones" referenced above and throughout this disclosure.

Further descriptions will now be made related to the detection of objects around the vehicle 100, and the factors that may be considered by the boundary detection tool to increase or decrease an object's threat level classification.

Figure 2:
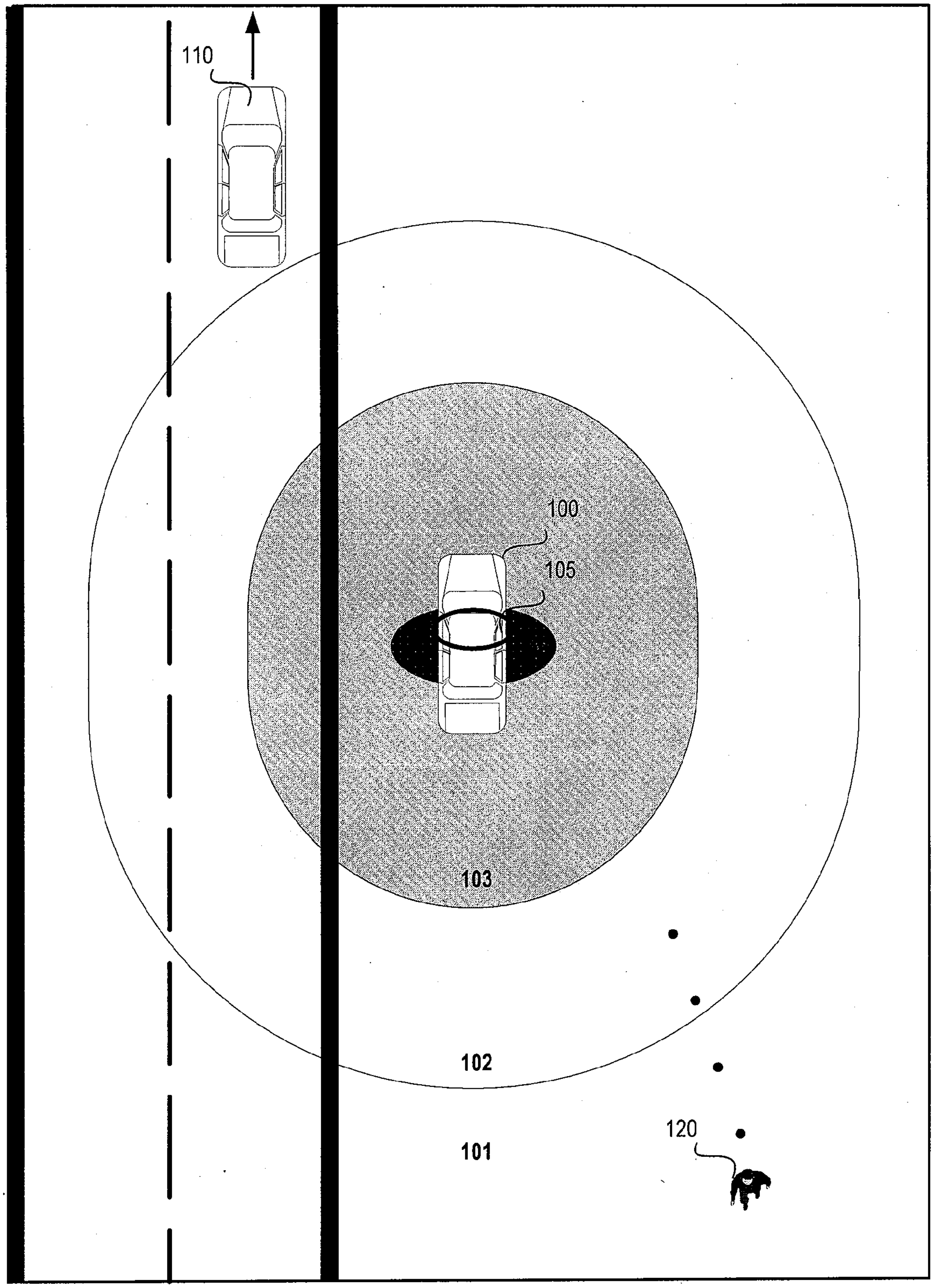
FIG. 2 illustrates an exemplary threat detection environment according to some embodiments.

FIG. 2 illustrates an environment where the vehicle 100 is in a parked state off the side of the road. For example, the vehicle 100 may be a police vehicle that has parked on the side of the road to conduct police business (e.g., traffic stop, monitoring traffic, etc.). In some embodiments, the detection of the vehicle 100 being in the parked state may initialize the boundary detection tool to start its analysis or activate a threat response capability. The boundary detection tool may identify the vehicle 100 as being in a parked state based on the vehicle 100 being in the parked gear state, inputs from a motion sensor identifying the vehicle 100 being in a stopped state (even when the vehicle 100 is not in the parked gear state), inputs from an accelerometer sensor identifying the vehicle 100 being in a stopped state (even when the vehicle 100 is not in the parked gear state), or some combination thereof. In some embodiments, the boundary detection tool may be running in some capacity while the vehicle is moving 100 as long as one or more components (e.g., sensors) of the boundary detection system are operational and detecting information on the surroundings of the vehicle 100.

The environment in FIG. 2 is illustrated to include a far zone 101, a mid zone 102, a near zone 103, a critical zone 104, and an occupied zone 105 that may be identified and referenced by the boundary detection tool. The environment in FIG. 2 is also illustrated to include a person 120 (i.e., object) walking away from the occupied zone 105 within the vehicle 100. The person 120 is illustrated as walking away from the occupied zone 105 at a slow and steady pace as indicative from the tracks following the person's walking path. The environment illustrated in FIG. 2 also includes a second vehicle 110 driving away from the occupied zone 105.

In the environment illustrated in FIG. 2, both objects, the person 120 and second vehicle 110, are located within the far zone 101. It follows that the boundary detection system on the vehicle 100 will detect both the person 120 and the second vehicle 110 within the far zone 101, and provide such object location information to the boundary detection tool running on the boundary detection system. In some embodiments, the far zone 101 may be defined to be outside the range of one or more of the sensors that comprise the boundary detection system. In such embodiments, the person 120 and second vehicle 110 may be considered to be within the no threat class by default as they are at a distance far enough away from the occupied zone 105 that they cannot be accurately detected. In either embodiment, the boundary detection tool may receive information from the sensors and initially identify the person 120 and second vehicle 110 as being classified within the no threat class based on the person 120 and second vehicle 110 being located at a distance away from the occupied zone 105 to be within the far zone 101.

As described above, the boundary detection tool may receive additional information on an object as the sensors of the boundary detection system tracks the object. For example, the sensors of the boundary detection system may initially detect an object within one or more of the zones surrounding the vehicle 100 (e.g., objects at a distance from the occupied zone 105 to be within the mid zone 102 and further in towards the vehicle 100), and proceed to determine the initial position, velocity, speed, and size (length, width, height, radar cross section) of the object within the zones. After the initial detection of the object, the sensors of the boundary detection system may continue to track the movement of the object (e.g., position, velocity, speed, acceleration) as the object moves within one or more of the zones. By providing the tracking information on the object to the boundary detection tool, the boundary detection tool may then generate calculations to predict the trajectory, or predicted further location, of the object and predict a future location or path of the object at a specific future time.

In addition, the boundary detection tool may receive the sensor information from the sensors of the boundary detection system to generate a prediction on the object's type classification. For example, the sensor information may provide information on the object's radar cross section, length, width, speed, or shape. The boundary detection tool may then cross reference the received sensor information against information that describes the characteristics that may classify an object into a distinct object type classification. Then based on this analysis the boundary detection tool may classify the object into one or more appropriate type classes. Exemplary object type classes may include a person class, an animal class (e.g., the animal class may further be classified into a threatening animal class and a non-threatening animal class), a motorized vehicle class (e.g., the motor vehicle class may further be classified into a passenger car class, a government agency vehicle class, and a larger truck class), a non-motorized vehicle class, a stationary object class, or a remote controlled device class. The information corresponding to the object type classification may be stored on a memory of the boundary detection system such that the information is accessible to the boundary detection tool. The type classes described above are provided for exemplary purposes, as it is within the scope of the boundary detection tool to identify a fewer, or greater, number of type classes when classifying the object type. In this way, the object being sensed may be a person, motorized vehicle, non-motorized vehicle, animal, remote controlled device, or other detectable object.

In some embodiments, the boundary detection tool may recognize an object that is classified into a certain object type class as further corresponding to be classified into a certain threat level class. For example, an object classified into the person class or motor vehicle class may be recognized by the boundary detection tool as being automatically classified into at least a low threat class. Additional factors and information received by the boundary detection tool may then be considered to further maintain the object within the low threat class, increase the object into the high threat class, or decrease the object into the no threat class. Further descriptions on the factors and information relied upon by the boundary detection tool when modifying an object's threat level classification is provided throughout this disclosure.

Figure 3:
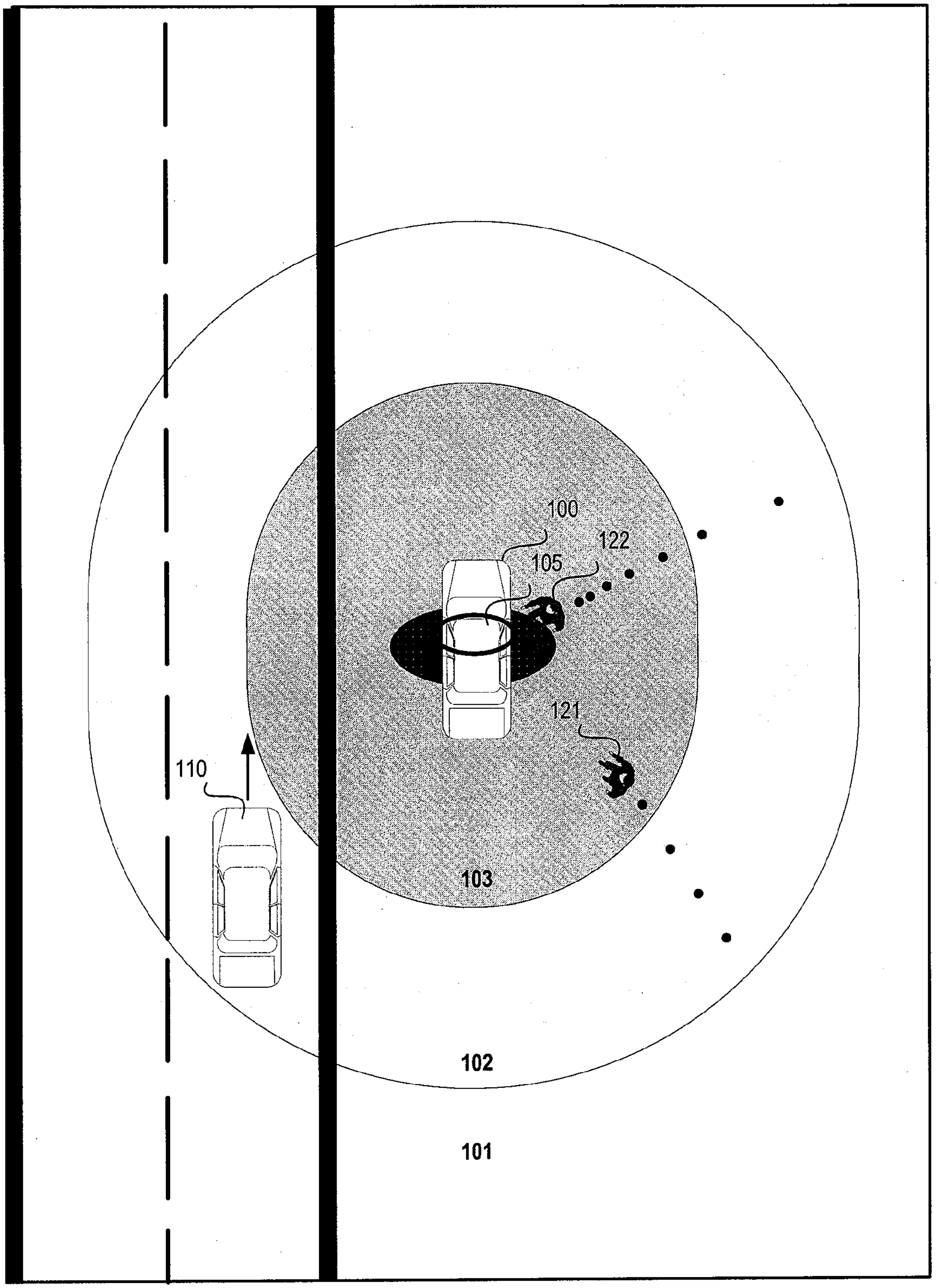
FIG. 3 illustrates an exemplary threat detection environment according to some embodiments.

For example, FIG. 3 illustrates an environment where an object's threat level classification may be increased or decreased by the boundary detection tool based on the sensor information received from the sensors of the boundary detection system as the object is tracked within the zones surrounding the vehicle 100.

FIG. 3 illustrates three objects within the environment surrounding the vehicle 100. The three objects include the second vehicle 110 positioned within the mid zone 102 and moving towards the near zone 103, the first person 121 walking steadily within the near zone 103 towards the critical zone 104, and the second person 122 currently within the critical zone 104 and rushing towards the occupied zone 105.

In some embodiments and as described above, the boundary detection tool may initially classify an object within one or more zones based on positional information received from one or more of the sensors that comprised the boundary detection system. For example, the boundary detection tool may receive sensor information detailing a position of the second vehicle 110 and determine that the second vehicle 110 is at a distance from the occupied zone 105 to be within the mid zone 102. The boundary detection tool may receive sensor information detailing a position of the first person 121 and determine that the first person 121 is at a distance from the occupied zone 105 to be within the near zone 103. And the boundary detection tool may receive sensor information detailing a position of the second person 122 and determine that the second person 122 is at a distance from the occupied zone 105 to be within the critical zone 104.

Further, in some embodiments the boundary detection tool may reference the object's zone position and/or distance from the occupied zone 105 to further assign a threat level classification to the object. For example, the boundary detection tool may further classify the second vehicle 110 into the no threat level class or low threat level class based on the second vehicle 110 being positioned at a distance from the occupied zone 105 to be in the mid zone 102. The boundary detection tool may further classify the first person 121 into the low threat level class based on the first person 121 being positioned at a distance from the occupied zone 105 to be in the near zone 103. And the boundary detection tool may further classify the second person 122 into the high threat level class based on the second person 122 being positioned at a distance from the occupied zone 105 to be in the critical zone 104. In other embodiments the boundary detection tool may not yet assign a threat level classification to the object based on the object's position classification into an identifiable zone.

In addition, in some embodiments the boundary detection tool may reference sensor information received from the one or more of the sensors that comprise the boundary detection system in order to classify each of the objects into an appropriate object type class. For example, the boundary detection tool may classify the second vehicle 110 into the motor vehicle type class based on received sensor information. Similarly, the boundary detection tool may classify the first person 121 and second person 122 into the person type class based on sensor information received from the one or more sensors that comprise the boundary detection system. In some embodiments, the boundary detection tool may then rely on the object's object type classification to further classify the object into a corresponding threat level classification. For example, the boundary detection tool may further classify the second vehicle 110 into the low threat level class based on the second vehicle 110 being identified and classified into the motor vehicle class. In other embodiments the boundary detection tool may not yet assign a threat level classification to the object based on the object's object type classification.

After determining the object's initial position and/or the object's object type classification, the boundary detection tool may continue to receive sensor information from the sensors as they track the objects surrounding the vehicle 100. Based on the received sensor information, the boundary detection tool may determine a trajectory or predicted path of the object in terms of the occupied zone 105. For example, in FIG. 3 the boundary detection tool may determine that the second vehicle 110 is moving towards the occupied zone 105 and/or moving from an outer zone (e.g., mid zone 102) to a more inner zone (i.e., near zone 103) closer to the occupied zone 105. Based on this determination that the object is moving towards the occupied zone 105, the boundary detection tool may assign a higher threat level classification to the object, or consider the object's path towards the occupied zone as a factor in maintaining or increasing the object's assigned threat level classification. This is exemplified by the second vehicle 110, the first person 121, and the second person 122 illustrated in FIG. 3 as advancing towards the occupied zone 105 and/or moving from an outer zone to a more inner zone closer to the vehicle 100 and the occupied zone 105. In such cases, the advancement of an object towards the occupied zone 105 and/or from an outer zone to a more inner zone may result in the boundary detection tool assigning a higher threat level classification to the objects, or considering a factor for maintaining or increasing each of the object's respective assigned threat level classification.

In addition or alternatively, the boundary detection tool may determine a rate of approach of the object in terms of the occupied zone 105 based on the sensor information received from the sensors of the boundary detection system. The rate of approach may correspond to a velocity, acceleration, deceleration, or other definable movement of the object that can be sensed by one or more sensors of the boundary detection system. The rate of approach may be classified, for example, as a fast, medium, steady, or slow rate of approach. For example, the boundary detection tool may analyze the sensor information to determine an object's rate of approach towards the occupied zone 105 corresponds to the object accelerating towards the occupied zone and/or accelerating from an outer zone to a more inner zone. In such cases, where the object is determined to be accelerating towards the occupied zone 105, the boundary detection tool may assign a higher threat level classification to the object, or consider the acceleration towards the occupied zone as a factor in increasing the object's assigned threat level classification. For example, the second person 122 is seen to be rapidly accelerating towards the vehicle 100 based on the second person's illustrated footsteps. In this case, the boundary detection tool may analyze the acceleration of the second person 122 towards the vehicle 100 as a threatening maneuver and assign a higher threat level classification, or further increase the second person's assigned threat level classification.

Further, the boundary detection tool may assign a lower threat level classification to an object, or decrease an object's assigned threat level classification when the boundary detection tool analyzes received sensor information and determines that the object is moving away from the occupied zone 105 and/or moving from an inner zone to a more outer zone further away from the vehicle 100 and the occupied zone 105. This is exemplified by the person 120 illustrated in FIG. 2 as walking away from the vehicle 100 and the occupied zone 105. Therefore, an analysis of the received sensor information that finds an object is moving away from the occupied zone 105 may result in the boundary detection tool assigning a lower threat level classification to the object, or considering a factor for maintaining or decreasing the object's assigned threat level classification. Similarly, an analysis of the received sensor information by the boundary detection tool that determines an object is accelerating away from the occupied zone 105 and/or accelerating from an inner zone to a more outer zone further away from the occupied zone may result in the boundary detection tool assigning a lower threat level classification to the object, or considering a factor to decrease the object's assigned threat level classification.

In addition or alternatively, the boundary detection tool may further receive the sensor information and generate a prediction on the future path of an object (e.g., trajectory) that is being tracked. The sensor information collected to determine the object's predicted path may include, but is not limited to, position, past positions, speed, velocity, acceleration, and the like for the object. When the predicted path of the object is determined to collide with the occupied zone 105 and/or vehicle 100, the boundary detection tool may assign a higher threat level classification to the object, or consider a factor to increase the object's assigned threat level classification to a higher threat level. If the boundary detection tool determines that the predicted trajectory of the object does not collide with the vehicle 100, the boundary detection tool may assign a lower threat level classification to the object, consider a factor to maintain the object's assigned threat level classification, or consider a factor to decrease the object's assigned threat level classification.

In addition or alternatively, the boundary detection tool may further receive the sensor information and generate a predicted time to impact/collision for the object being tracked (e.g., second vehicle 110, first person 121, or second person 122) and the occupied zone 105 and/or vehicle 100. The predicted time to impact information may be calculated by the boundary detection tool based on an analysis of one or more of the following pieces of information: position, past positions, speed, velocity, acceleration, and the like for the object. Based on the predicted time to impact, the boundary detection tool may assign a higher threat level classification to the object, or consider a factor to increase the object's assigned threat level classification if the predicted time to impact is less than a predetermined amount of time. In addition, the boundary detection tool may assign a lower threat level classification to the object, or consider a factor to maintain the object's assigned threat level classification, or consider a factor to decrease the object's assigned threat level classification, if the predicted time to impact is greater than a predetermined amount of time.

Based on an analysis of one or more of the factors described above (e.g., distance of the object from the occupied zone 105 and/or current zone location of the object, object type classification, predicted path of the object, rate of approach of the object towards/away from the occupied zone 105, predicted time to collision of the object and the occupied zone 105 and/or vehicle 100), the boundary detection tool may generate a threat level classification to assign to the object. The list of factors provided above is for exemplary purposes, as it is within the scope of the disclosure for the boundary detection tool to consider greater, or fewer, factors than those specifically described.

In addition, the boundary detection tool may further adjust the threat level classification based on one or more sensitivity level settings. The boundary detection level, for example, may be operating in one of two sensitivity level settings: high or low. The high sensitivity level may correspond to a heightened sensitivity that applies a higher threat level classification for an object attribute or sensed information when compared to the same object attribute or sensed information under the low sensitivity level. FIG. 7 illustrates a table 700 that identifies the difference in threat level classifications assigned to an object based on a sensitivity level the boundary detection tool is operating under. As illustrated by FIG. 7, under otherwise same conditions, the boundary detection tool may assign a high, or higher, threat level classification to an object when the boundary detection tool is operating a high sensitivity level as opposed to a low sensitivity level. For example, although an object at 5 meters away from the occupied zone 105 may not warrant a high threat classification under a low sensitivity level, the boundary detection tool operating in the high sensitivity level may assign a high threat classification to the same object located 5 meters away from the occupied zone 105.

In addition or alternatively, under the heightened sensitivity of the high sensitivity level, the boundary detection tool may categorize more object attributes as being classified under a high, or higher, threat classification. For example, although under normal conditions (e.g., non-high sensitivity levels or low sensitivity level) the boundary detection tool may not take an object's temperature into consideration, under the higher sensitivity level the boundary detection tool may utilize temperature sensors in order to take the object's temperature into consideration when determining the object's overall threat level classification.

Although the table 700 includes exemplary factors (e.g., distance from occupied zone, rate of approach, object type classification) that may be considered by the boundary detection tool when determining the threat level classification of an object, it is within the scope of this disclosure for the boundary detection tool to consider fewer, or greater, number of factors specifically described herein, or not, when determining the threat level classification of an object.

The sensitivity level of the boundary detection tool may be selected based on an occupant's direct input to control the sensitivity level into the boundary detection tool. In addition or alternatively, the sensitivity level may be changed based on a sensitivity triggering event recognized by the boundary detection tool from an analysis of received sensor information. The boundary detection tool may receive sensor information from one or more sensors of the boundary detection system. For example, a recognition by the boundary detection tool that an occupant of the vehicle 100 may be preoccupied (e.g., inputting commands into an on-board computer or other similar computing device that is part of the vehicle 100 or boundary detection system) may cause the boundary detection tool to select the high sensitivity level. In addition, a recognition by the boundary detection tool that the vehicle 100 is surrounded by a specified number of objects (e.g., the vehicle is in a crowded environment), may cause the boundary detection tool to select the high sensitivity level. In addition, the boundary detection tool may rely on other vehicle 100 devices to recognize scenarios where the high sensitivity level should be selected. For example, the boundary detection tool may receive positioning information from a GPS device of the vehicle to recognize the vehicle 100 is in an area known to have a higher crime rate. In response, the boundary detection tool may select the high sensitivity status. The boundary detection tool may also receive clock information from a time keeping device of the vehicle 100 and recognize it is a time of day (e.g, after/before a certain time) known to have a higher crime rate. In response, the boundary detection tool may select the high sensitivity status.

Similarly, the boundary detection tool may analyze sensor information and/or vehicle device information to recognize certain scenarios where the low sensitivity level should be selected. For example, recognition by the boundary detection tool that the vehicle 100 is surrounded by a large number of objects may cause the boundary detection tool to select the low sensitivity level in order to limit the number of false alarms due to the known increase in number of detectable objects surrounding the vehicle.

After determining an object's threat level classification, the boundary detection system may implement a corresponding threat response output. The threat response output may be any combination of an audio, visual, or haptic feedback response capability of the boundary the boundary detection system and/or vehicle 100. The corresponding threat response output may be controlled by the boundary detection tool based on the object's threat level classification. A list of threat level classifications and their corresponding threat response output information may be stored within a memory of the boundary detection system.

For example, the boundary detection tool may control the type of threat response output based on the object's threat level classification. In some embodiments, an object with an assigned threat level classification that at least meets a predetermined threat level (e.g., low threat) may have an audio type of threat response output. For example, if the threat level classification for an object is a low threat level classification, the boundary detection tool may control a speaker to output a warning message to an occupant of the vehicle 100 warning the occupant about the object being tracked. If the threat level classification for the object is a high threat level classification, the boundary detection tool may output a different threat response (e.g., audio warning to the occupant, audio warning to the object outside the vehicle 100, and/or display a warning for the occupant inside the vehicle 100). In this way, the boundary detection tool may have a predetermined set of rules that identify a proper threat response output for an identified threat level classification and object type classification.

Some of the exemplary threat response outputs that may correspond to a specified threat level classification include, but are not limited to, an audible warning output to the occupants of the vehicle 100, an audible warning output to the object being tracked by the boundary detection system outside of the vehicle 100, a haptic warning response for occupants within the vehicle 100 (e.g., a vibrating component within the vehicle cabin seat(s), dashboard, or instrument panel), or a visual notification for an occupant of the vehicle 100 (e.g., a warning message, flag, pop-up icon, or other identifier for informing the occupant about the tracked object outside the vehicle 100). In some embodiments, the boundary detection tool may activate or deactivate one or more threat response medium (e.g., audio, visual, haptic) based on an input received from the user and/or a determination processed by the boundary detection tool based on received sensor inputs. For example, in some embodiments the user may desire to maintain a low profile, and therefore disable audio and/or haptic feedback types of threat responses while only allowing visual output types of threat responses to be output by the boundary detection tool. The enabling of only the visual mode for outputting a threat response may correspond to a specific mode (e.g., stealth mode) of operation implemented by the threat response tool based on a received user input or analysis of received sensor inputs. In other embodiments, the user may be preoccupied (e.g., driving) or under a necessity to remain hidden (e.g., need to maintain stealth position in a police stakeout) to be staring at a display screen that outputs visual types of threat responses, and therefore in such embodiments the user may only enable audio and/or haptic types of threat response outputs. The disabling of the display screen for outputting a threat response may correspond to a specific mode (e.g., driving mode, or dark mode) of operation by the threat response tool based on a received user input or analysis of received sensor inputs.

In some embodiments the threat response output may activate or deactivate one or more vehicle actuators in response to the determination of an object's threat level classification. Exemplary vehicle actuators that may be activated or deactivated by the boundary detection tool include vehicle alarm systems, vehicle power door locks, vehicle power windows, vehicle sirens (e.g., police vehicle sirens), vehicle external lights (e.g., police vehicle lights), vehicle audio/radio system, vehicle in-cabin displays, or vehicle ignition system.

In addition or alternatively, a high level threat level classification (e.g., emergency threat level) may cause the boundary detection tool to initiate a threat response that transmits a distress communication to an off-site central command. The central command may, for example, be a police command center, another police vehicle, or another emergency response vehicle. By transmitting the distress communication to the central command, the boundary detection tool may request additional support for the occupants in the vehicle.

In addition or alternatively, the boundary detection tool may initiate a threat response based on a threat response triggering event that may not be directly tied to the object's threat level classification. For example, the boundary detection tool may identify a threat response triggering event to be, for example, an object being detected within a predetermined zone, an object being detected within a predetermined distance from the occupied zone 105 and/or vehicle 100, an object being classified as a predetermined object type, an object predicted to collide with the occupied zone 105 and/or vehicle 100, an object predicted to collide with the occupied zone 105 and/or 100 within a predetermined time, or an object being classified within a predetermined threat level. In such embodiments, the boundary detection tool may initiate one or more of the threat responses described above as a corresponding threat response for a recognized threat response triggering event. This list of exemplary threat response triggering events is provided for exemplary purposes, and it is within the scope of the present disclosure for the boundary detection tool to recognize fewer, or greater, types of threat response triggering events.

In some embodiments, the parameters of the boundary detection tool described herein may be modified. For example, a user may modify the number of identifiable zones, modify the threat level classification corresponding to each identifiable zone, modify the threat level classification corresponding to each object type, modify an increasing factor to an object's assigned threat level classification for a specific sensor input information (e.g., modify the number of threat levels an object will increase when the object is determined to be accelerating towards the vehicle 100), modify a decreasing factor to an object's assigned threat level classification for a specific sensor input information (e.g., modify the number of threat levels an object will decrease when the object is determined to be accelerating away the vehicle 100), or modify the threat response output that corresponds to a given threat level classification. A user may input the commands to modify parameters of the boundary detection tool via an instrument cluster panel that accepts user inputs. In some embodiments the boundary detection tool may not accept modifications to its parameters unless the user is able to provide proper authentication information first. This list of modifiable parameters of the boundary detection tool is provided for exemplary purposes only, as it is within the scope of this disclosure that the boundary detection tool will allow a user to modify a greater, or fewer, number of parameters than listed.

With regards to a displaying capability of the boundary detection tool, the boundary detection tool may control a display unit of the boundary detection system to display any one or more of the information received, generated, or determined by the boundary detection tool as described herein. For example, the boundary detection tool may control the display unit to display a representation of an environment surrounding the vehicle 100 similar to the environments illustrated in FIGS. 1, 2, and 3. Like the environments illustrated in FIGS. 1, 2, and 3, the boundary detection tool may control the display unit to display the vehicle 100, one or more zones (e.g., far zone, mid zone, near zone, critical zone, occupied zone), surrounding objects that have been detected and identified by the boundary detection system and boundary detection tool (e.g., second vehicle 110, first person 121, second person 122), and nearby roads and other road features (e.g., stop signs, traffic signals). The boundary detection tool may also control the display unit to display any of the obtained information to overlay the display of the surrounding environment. For example, the display of the surrounding environment may include arrows identifying a predicted trajectory of an object, footprints or "breadcrumb" identifiers that identify the previous path of objects as they are tracked within the zones, speed information of an object, velocity information of an object, acceleration information of an object, object type classification of an object, or threat level classification of an object. This list of potential information that may be displayed by the boundary detection tool onto a display unit is provided for exemplary purposes, and it is within the scope of the present disclosure to include more, or less, information on such a display.

The boundary detection tool may generate the environment display based on one or more of the following: sensor information sensed by one or more sensors that comprise the boundary detection system, Global Positioning System (GPS) information obtained by a GPS system that may be part of the boundary detection system, or map layout information stored on a memory of the boundary detection system. This list of information that the boundary detection tool may rely upon when generating the display is provided for exemplary purposes, and it is within the scope of the present disclosure for the boundary detection tool to rely on more, or less, information when generating such a display.

In some embodiments, the boundary detection tool may control a data recording device to begin recording sensor information based on a predetermined recording triggering event. Based on the boundary detection tool recognizing a recording triggering event has occurred, the boundary detection tool may control the data recording device to begin recording information. The information recorded by the data recording device may be sensor information such as detected position data of an object, speed data of an object, velocity data of an object, acceleration data of an object, a video camera recording of an object, or a snapshot digital image of an object. The information recorded by the data recording device may also be information generated by the boundary detection tool based on an analysis of received sensor information such as an object's object type classification or threat level classification. This list of information that may be recorded by the data recording device is provided for exemplary purposes, and it is within the scope of the present disclosure for the data recording device to record fewer, or greater, types of information.

In some embodiments one or more types of information may be recorded for a predetermined amount of time before or after the recording triggering event is recognized. For example, the boundary detection tool may control the data recording device to begin recording one or more types of information for a set amount of time (e.g., record information for 1 minute) before and/or after the recording trigger event is recognized. In some embodiments one or more types of information may be recorded by the data recording device throughout the duration of the predetermined recording triggering event being active.

The boundary detection tool may identify a recording triggering event to be, for example, an object being detected within a predetermined zone, an object being detected within a predetermined distance from the occupied zone 105 and/or vehicle 100, an object being classified as a predetermined object type, an object predicted to collide with the occupied zone 105 and/or vehicle 100, an object predicted to collide with the occupied zone 105 and/or 100 within a predetermined time, or an object being classified within a predetermined threat level. This list of exemplary recording triggering events is provided for exemplary purposes, and it is within the scope of the present disclosure for the boundary detection tool to recognize fewer, or greater, types of recording triggering events.

After information is stored on the data recording device, a user may access the information by retrieving it (e.g., removing a removable memory component of the data recording device, or downloading the information via a wired or wireless data transfer interface), copying it, viewing it, or clearing the information from the data recording device logs. In some embodiments, the boundary detection tool may require the user to input the proper credentials in order to access the information stored on the data recording device.

In some embodiments, the boundary detection tool may determine when to activate the threat response outputs based on the recognition of a response output triggering event. In such embodiments, the sensors of the boundary detection system may be tracking and obtaining sensor information on an object surrounding the vehicle 100, and the boundary detection tool may be implementing the features described throughout this description, but the corresponding threat response output may be withheld until the boundary detection tool recognizes the appropriate response output triggering event. For example, a threat response output triggering event may require the boundary detection tool to first make a determination that the vehicle 100 is in a parked state before activating the threat response outputs. The boundary detection tool may determine the vehicle 100 is in the parked state based on sensor information received from one or more sensors of the boundary detection tool that identify the vehicle 100 as not moving, or at least moving below a predetermined minimal speed. The boundary detection tool may also determine the vehicle 100 is in the parked state based on information received from the vehicle 100 identifying that the vehicle 100 is in the parked gear setting.

Figure 4:
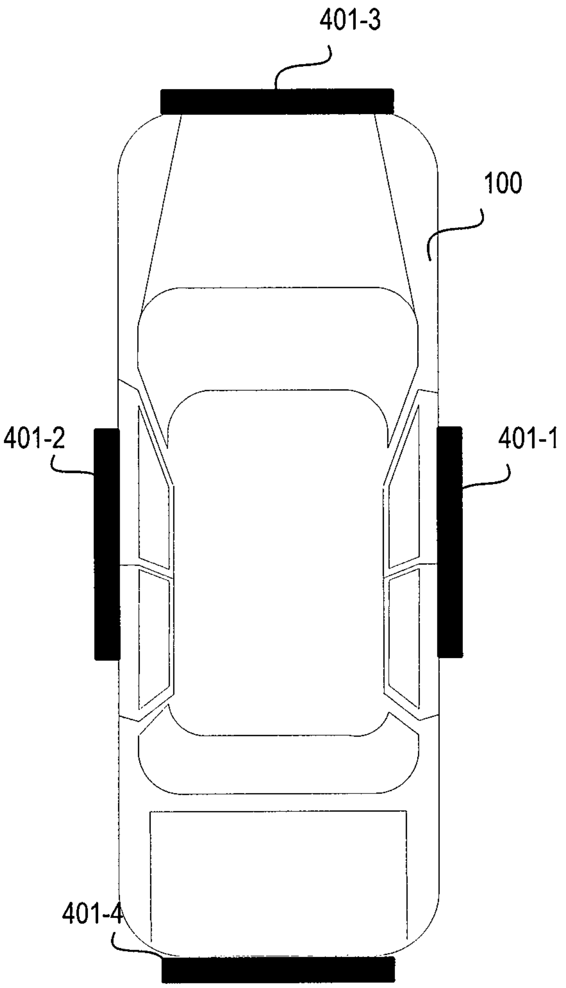
FIG. 4 illustrates an exemplary vehicle equipped with sensors of the boundary detection system according to some embodiments.

FIG. 4 illustrates the vehicle 100 and a set of sensors that may comprise the boundary detection system described herein. The passenger side sensor unit 401-1 may be comprised of one or more sensors that are configured to sense objects on the passenger side of the vehicle 100. The driver side sensor unit 401-2 may be comprised of one or more sensors that are configured to sense objects on the driver side of the vehicle 100. The front side sensor unit 401-3 may be comprised of one or more sensors that are configured to sense objects on the front side of the vehicle 100. The back side sensor unit 401-4 may be comprised of one or more sensors that are configured to sense objects on the back side of the vehicle 100. The sensors that comprise the sensor units may include one or more of the following: a radar sensor, an ultrasonic sensor, a camera, a video camera, an infrared sensor, a lidar sensor, or other similar types of sensors for detecting and tracking an object that may surround a vehicle. In this way, the boundary detection system may detect and track an object outside of the vehicle 100. Although FIG. 4 illustrates 4 separate sensor units (401-1, 401-2, 401-3, and 401-4), it is within the scope of this disclosure that the boundary detection system includes a fewer, or greater, number of sensor units. For example, in some embodiments the sensor units may only be found on the passenger side and driver side as threatening objects may be determined to more predominately approach a vehicle from these two sides.

In addition, one or more of the sensor units (401-1, 401-2, 401-3, and 401-4), or a sensor unit not specifically illustrated in FIG. 4, may be utilized to sense objects that are above or below the vehicle 100.

Figure 5:
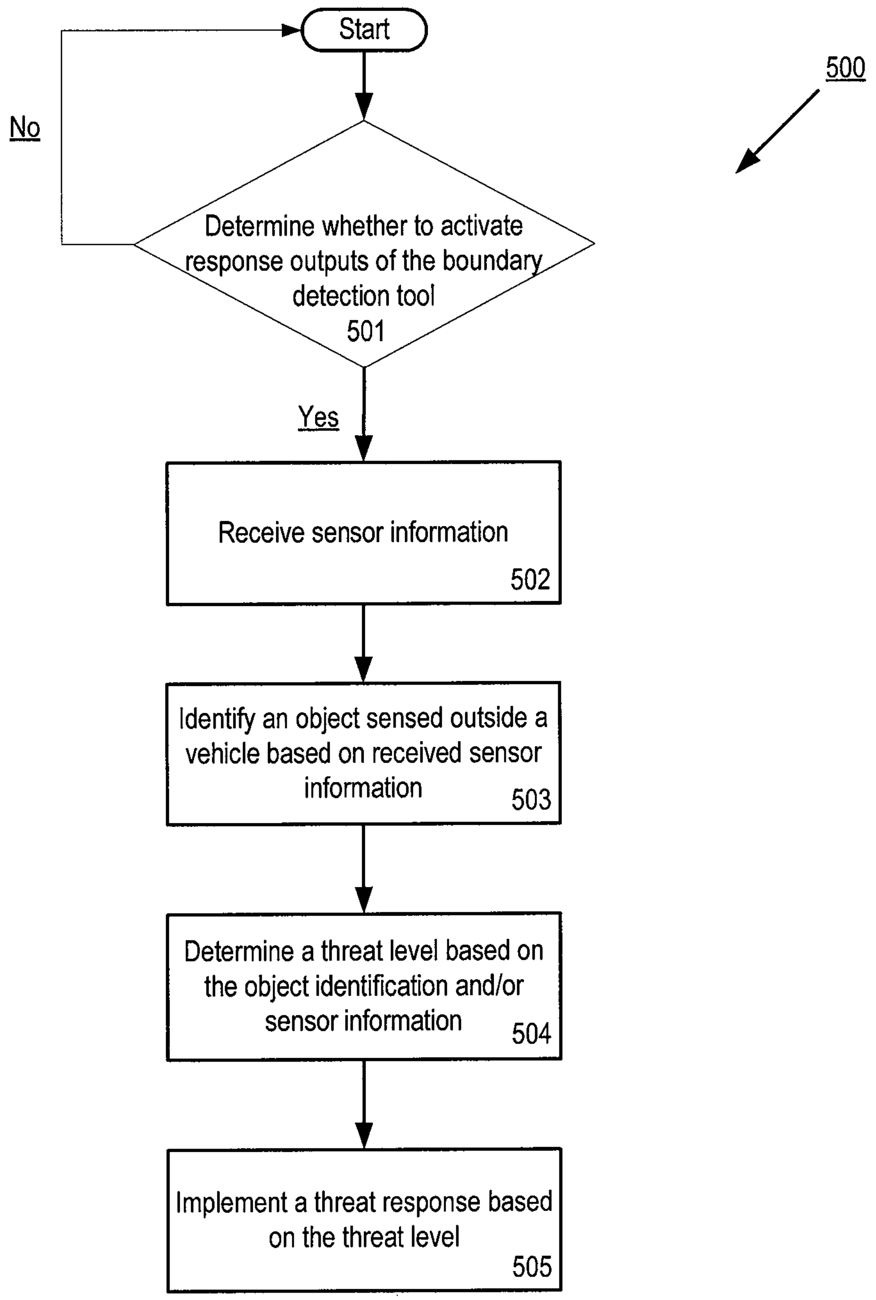
FIG. 5 illustrates an exemplary flow chart describing a process according to some embodiments.

FIG. 5 illustrates a flow chart 500 describing a process for achieving one or more of the features of the boundary detection tool described throughout this disclosure.

At 501, a determination is made as to whether to activate threat response outputs of the boundary detection tool. This determination as to whether to activate the threat response outputs may be in accordance to any one or more of the methods described above in this disclosure. For example, the boundary detection tool may make a determination as to whether a proper response output triggering event (e.g., determining whether the vehicle is parked) is recognized from sensor information received by the boundary detection tool. If the boundary detection tool determines that the threat response outputs should not be activated, the process returns to the start and back to 501 until the proper conditions for activating the threat response outputs are recognized by the boundary detection tool.

However, if the boundary detection tool determines that the proper conditions are met at 501, then the process proceeds to 502 where the boundary detection tool receives sensor information from one or more sensors that comprise the boundary detection system. The sensor information may correspond to the detection and tracking of an object outside of a vehicle. Descriptions of the boundary detection system receiving sensor information from one or more sensors of the boundary detection system are provided throughout this disclosure. The sensors that may comprise the boundary detection system are described throughout this disclosure. For example, exemplary sensors have been described with reference to FIG. 4 above, and described in additional detail with reference to FIG. 6 below.

At 503, the boundary detection tool may analyze the received sensor information and identify an object that has been detected by the sensors. For example, the boundary detection tool may analyze the received sensor inputs and classify the object into one or more of object type classifications according to any one or more of the methods described above. Also at 503, the boundary detection tool may analyze additional sensor information to determine a distance of the object from an occupied zone of the vehicle, predict a path of the object, determine a rate of approach of the object in terms of the occupied zone and/or vehicle, or predict a time to collision of the object in terms of the occupied zone and/or vehicle.

At 504, the boundary detection tool may determine a threat level classification for the object based on the object type classification from 503 and/or the analysis of the additional sensor information received from the one or more sensors of the boundary detection system. A more detailed description for determining the threat level classification of an object is provided above. The boundary detection tool may determine the threat level classification to assign to the object according to any one or more of the methods described above. In addition, the boundary detection tool may further increase, maintain, or decrease a previously assigned threat level classification corresponding to the object based on the object type classification and/or the analysis of the additional sensor information according to one or more of the methods described above.

At 505, the boundary detection tool may implement a proper threat response output based on the threat level classification assigned to the object at 504. The boundary detection tool may implement the proper threat response output according to any one or more of the methods described above.

The process described by flow chart 500 is provided for exemplary purposes only. It is within the scope of the boundary detection tool described in this disclosure to achieve any one or more of the features, processes, and methods described herein by implementing a process that may include fewer, or greater, number of processes than described by flow chart 500. For example, in some embodiments the processes described with reference to 501 may be optional such that they may not be implemented by the boundary detection tool. In addition, the boundary detection tool may not be limited to the order of processes described in flow chart 500 in order to achieve the same, or similar, results.

Figure 6:
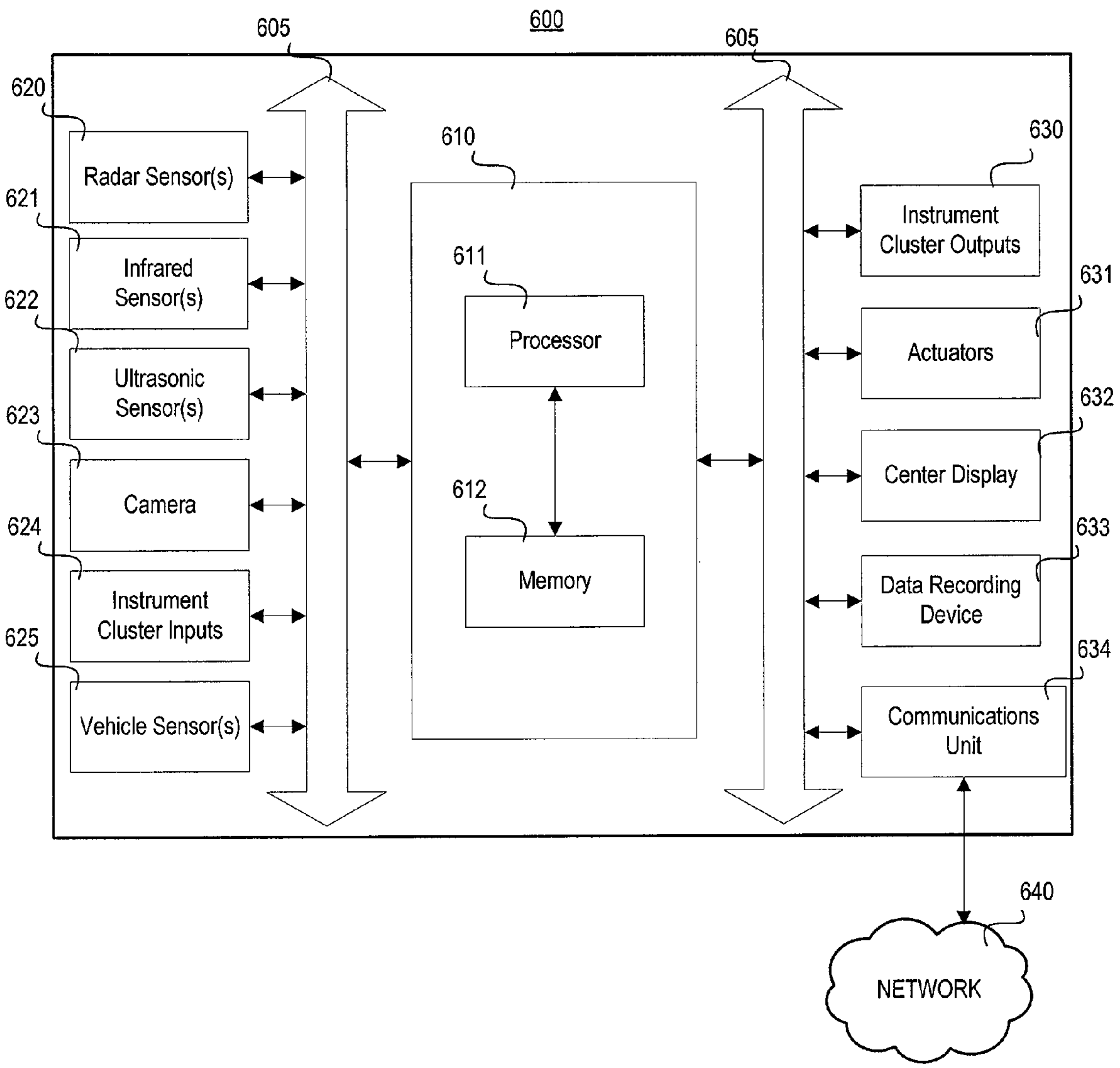
FIG. 6 illustrates an exemplary block diagram including components of the boundary detection system according to some embodiments.

FIG. 6 illustrates an exemplary boundary detection system 600 that may be used for one or more of the components of the boundary detection system described herein, or in any other system configured to carry out the methods and features discussed above.

The boundary detection system 600 may include a set of instructions that can be executed to cause the boundary detection system 600 to perform any one or more of the methods, processes, or features described herein. For example, the processing unit 610 may include a processor 611 and a memory 612. The boundary detection tool described throughout this disclosure may be a program that is comprised of a set of instructions stored on the memory 612 that are executed by the processor 611 to cause the boundary detection tool and boundary detection system 600 to perform any one or more of the methods, processes, or features described herein.

The boundary detection system 600 may further be comprised of system input components that include, but are not limited to, radar sensor(s) 620, infrared sensor(s) 621, ultrasonic sensor(s) 622, camera 623 (e.g., capable of capturing digital still images, streaming video, and digital video), instrument cluster inputs 624, and vehicle sensor(s) 625. The boundary detection system 600 may receive information inputs from one or more of these system input components. It is further within the scope of this disclosure that the boundary detection system 600 receives input information from another component not expressly illustrated in FIG. 6 such as a lidar sensor or other imaging technologies. The input components are in communication with the processing unit 610 via the communications bus 605. In some embodiments, the boundary detection system 600 may include an additional gateway module (not expressly illustrated) in-between the system input components and the processing unit 610 to better allow for communication between the two. Inputs into the boundary detection tool and the boundary detection system described throughout this disclosure may be inputted via one or more of the system input components described herein.

The boundary detection system 600 may further include system output components such as instrument cluster outputs 630, actuators 631, center display 632, and data recording device 633. The system output components are in communication with the processing unit 610 via the communications bus 605. Information output by the boundary detection tool and the boundary detection system described throughout this disclosure may be implemented according to one or more of the system input components described here. For example, the threat response outputs may be implemented according to one or more of the system output components described herein. Although not specifically illustrated, the boundary detection system 600 may also include speakers for outputting audible alerts. The speakers may be part of the instrument cluster or part of other vehicle subsystems such as the infotainment system.

The boundary detection system 600 is illustrated in FIG. 6 to further include a communications unit 634. The communications unit 634 may be comprised of a network interface (either wired or wireless) for communication with an external network 640. The external network 640 may be a collection of one or more networks, including standards-based networks (e.g., 2G, 3G, 4G, Universal Mobile Telecommunications System (UMTS), GSM (R) Association, Long Term Evolution (LTE) (TM), or more), WiMAX, Bluetooth, near field communication (NFC), WiFi (including 802.11 a/b/g/n/ac or others), WiGig, Global Positioning System (GPS) networks, and others available at the time of the filing of this application or that may be developed in the future. Further, the network(s) may be a public network, such as the Internet, a private network, such as an intranet, or combinations thereof, and may utilize a variety of networking protocols now available or later developed including, but not limited to TCP/IP based networking protocols.

In some embodiments the program that embodies the boundary detection tool may be downloaded and stored on the memory 612 via transmission through the network 640 from an off-site server. Further, in some embodiments the boundary detection tool running on the boundary detection system 600 may communicate with a central command server via the network 640. For example, the boundary detection tool may communicate sensor information received from the sensors of the boundary detection system 600 to the central command server by controlling the communications unit 634 to transmit the information to the central command server via the network 640. The boundary detection tool may also communicate any one or more of the generated data (e.g., object type classification or threat level classification) to the central command server. The boundary detection tool may also transmit data recorded into the data recording device 633, and as described throughout this disclosure, to the central command server by controlling the recorded data to be transmitted through the communications unit 634 to the central command server via the network 640. In response, the central command server may transmit response information back to the boundary detection tool via the network 640, where the response information is received by the communications unit 634.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle boundary detection system, comprising:

a memory storing threat identification information;

a sensor unit obtaining sensor information about a sensed object; and a processor determining a threat level, selecting a sensitivity level, and controlling a threat response based on at least one of the sensor information or the threat identification information, and increasing the threat level for the object when the sensitivity level is high;

wherein the processor is further configured to:

analyze the sensor information;

determine a threat level for the object based on the sensor information and the threat identification information, and control the threat response based on the threat level;

wherein the processor is configured to analyze the sensor information to:

determine a distance of the object from the vehicle based on the analysis of the sensor information;

determine a rate of approach of the object towards the vehicle based on the analysis of the sensor information; and wherein the processor is further configured to determine the threat level for the object based on the distance of the object from the vehicle and the object's rate of approach.

2. The vehicle boundary detection system of claim 1, wherein the processor is further configured to:

increase the threat level when the analysis of the sensor information identifies the object as being located within a predetermined distance from the vehicle or determines the object's rate of approach towards the vehicle is greater than a predetermined rate threshold;

wherein the sensor unit includes at least one of a radar sensor, ultrasonic sensor, lidar sensor, infrared sensor, or a camera.

3. The vehicle boundary detection system of claim 1, wherein the processor is configured to analyze the sensor information to:

determine a predicted future location of the object based on the sensor information;

determine whether the object is predicted to collide with the vehicle based on the predicted future location of the object; and increase the object threat level if the predicted future location of the object is determined to collide with the vehicle.

4. The vehicle boundary detection system of claim 1, wherein the processor is configured to analyze the sensor information to:

determine a predicted future location of the object based on the sensor information;

determine whether the object is predicted to collide with the vehicle based on the predicted future location of the object;

determine an estimated time to collision of the object with the vehicle based on whether the object is predicted to collide with the vehicle, and increase the object threat level if the estimated time to collision is less than a predetermined time.

5. The vehicle boundary detection system of claim 1, wherein the processor is further configured to:

determine a location of the object relative to vehicle, and classify the object as being within one of at least three threat detection zones that include a far zone, a near zone, and an occupied zone, wherein the occupied zone is within the vehicle, wherein the near zone includes at least a distance between the occupied zone and the far zone where the sensor unit senses the object, and wherein the far zone is further away from the occupied zone than the near zone;

wherein the processor is configured to classify the object in a high threat class when the received sensor information identifies the object as being located within a predetermined distance from the occupied zone.

6. The vehicle boundary detection system of claim 1, wherein the processor is further configured to:

analyze the received sensor information;

determine whether a recording triggering event is recognized based on the analysis; and cause a recording unit to record sensor information when the recording triggering event is recognized from the analysis.

7. A vehicle boundary detection system, comprising:

a vehicle having memory, distance sensors, and a processor running a boundary program configured to, upon detecting vehicle park:

find velocity and acceleration of a sensed object toward the vehicle;

determine a sensitivity based on a detected vehicle occupant preoccupation;

determine a threat level based on the sensed object's velocity, acceleration, sensitivity, and position;

trigger a threat response based on the threat level.

8. The system of claim 7, wherein the boundary program is configured to base the sensitivity on crowding around the vehicle, time of day, and GPS coordinates of the vehicle.

9. The system of claim 7, wherein the boundary program is configured to affirmatively detect vehicle occupant preoccupation when user commands are input into a vehicle user-interface.

10. The system of claim 7, wherein the boundary program is configured to trigger the threat response by broadcasting a sound on vehicle audio speakers.

11. The system of claim 7, wherein the boundary program is configured to only trigger the threat response upon detecting vehicle park.

12. The system of claim 11, wherein the boundary program is configured to map the position of the object with respect to a plurality of zones centered around the vehicle.

13. The system of claim 12, wherein at least one of the zones is asymmetrical.

14. The system of claim 13, wherein the asymmetrical zone is oval-shaped and thus asymmetrical about a reference axis at an acute angle with respect to the vehicle's longitudinal axis.

15. The system of claim 12, wherein the at least one of the zones only includes areas immediately adjacent to a driver side and a passenger side of the vehicle.

16. The system of claim 7, wherein the boundary program is configured to classify sensed objects and to automatically assign sensed vehicles and people at least a predetermined minimum threat class, and the threat level of the sensed object is also based on the threat class of the sensed object.

17. The system of claim 7, wherein the boundary program is configured to base the threat level on a temperature of the sensed object.

18. The system of claim 17, wherein the boundary program is configured to base the threat level on the sensed object's temperature only for one or more predetermined sensitivities.

19. A method of monitoring boundaries in a vehicle having memory, distance sensors, and a processor, comprising, upon detecting vehicle park with a boundary program running on the processor:

finding velocity and acceleration of a sensed object toward to the vehicle;

determining a sensitivity based on a detected vehicle occupant preoccupation;

determining a threat level based on the position, velocity, acceleration, sensitivity, and position;

triggering a threat response based on the threat level.

20. The method of claim 19, wherein the boundary program is configured to:

base the sensitivity on crowding around the vehicle, time of day, and GPS coordinates of the vehicle, and map the position of the object with respect to at least one asymmetrical zone centered around the vehicle.

* * * * *